(12) United States Patent
Vålberg

(10) Patent No.: US 9,986,677 B2
(45) Date of Patent: Jun. 5, 2018

(54) SYSTEM AND METHOD OF AN AGRICULTURAL MACHINE TO OPTIMISE WORKING CAPACITY

(71) Applicant: Väderstad Holding AB, Väderstad (SE)

(72) Inventor: Stefan Vålberg, Linköping (SE)

(73) Assignee: Väderstad Holding AB, Väderstad (SE)

( * ) Notice: Subject to any disclaimer, the term of this patent is extended or adjusted under 35 U.S.C. 154(b) by 0 days. days.

(21) Appl. No.: 15/033,876

(22) PCT Filed: Oct. 30, 2014

(86) PCT No.: PCT/SE2014/051287
§ 371 (c)(1),
(2) Date: May 2, 2016

(87) PCT Pub. No.: WO2015/065282
PCT Pub. Date: May 7, 2015

(65) Prior Publication Data
US 2016/0278277 A1 Sep. 29, 2016

(30) Foreign Application Priority Data
Nov. 4, 2013 (SE) ...................... 1351305

(51) Int. Cl.
*A01B 79/00* (2006.01)
*A01C 21/00* (2006.01)
*A01B 69/00* (2006.01)

(52) U.S. Cl.
CPC ............ *A01B 79/005* (2013.01); *A01C 21/00* (2013.01); *A01C 21/005* (2013.01); *A01B 69/00* (2013.01)

(58) Field of Classification Search
CPC ....... A01B 79/005; A01B 69/00; A01C 21/00; A01C 21/005
(Continued)

(56) References Cited

U.S. PATENT DOCUMENTS 5,666,793 A 9/1997 Bottinger
9,527,211 B2 * 12/2016 Posselius ............. G05D 1/0295
(Continued)

FOREIGN PATENT DOCUMENTS

| DE | 102010016686 A1 | 11/2011 |
| EP | 0878119 B1 | 11/1998 |
| EP | 1369017 A1 | 12/2003 |

OTHER PUBLICATIONS

International Search Report for PCT/SE2014/051287, dated Feb. 23, 2015.
(Continued)

*Primary Examiner* — Gertrude Arthur Jeanglaude
(74) *Attorney, Agent, or Firm* — Davis Wright Tremaine LLP

(57) ABSTRACT

A method and a system in an agricultural machine for the coordination of agricultural machines when refilling substance intended to be disseminated over an agricultural field by generating coordination data indicative of an optimum refill location, comprising a level sensor arranged for generating level data, said level data indicating a volume of a substance in a substance reservoir; a position sensor for generating and storing position data and storing or reading a preplanned route; a communication device arranged for transmitting and receiving data; characterized by: a coordination device generating coordination data, based on said level data, said preplanned route and said position data; and transmitting said generated coordination data via the communication device to a refill vehicle.

21 Claims, 12 Drawing Sheets

(58) Field of Classification Search
USPC .................................. 701/36, 50; 172/4.5, 9
See application file for complete search history.

(56) References Cited

U.S. PATENT DOCUMENTS

2004/0084551 A1   5/2004   Vickers et al.
2007/0135190 A1   6/2007   Diekhans et al.
2011/0084851 A1   4/2011   Peterson et al.

OTHER PUBLICATIONS

Technical Notice, dated Apr. 29, 2014, issued in corresponding Swedish Application No. 1351305-6.
Written Opinion of the International Searching Authority dated Feb. 23, 2015, International Patent Application No. PCT/SE2014/051287, filed Oct. 30, 2014, nine pages.

* cited by examiner

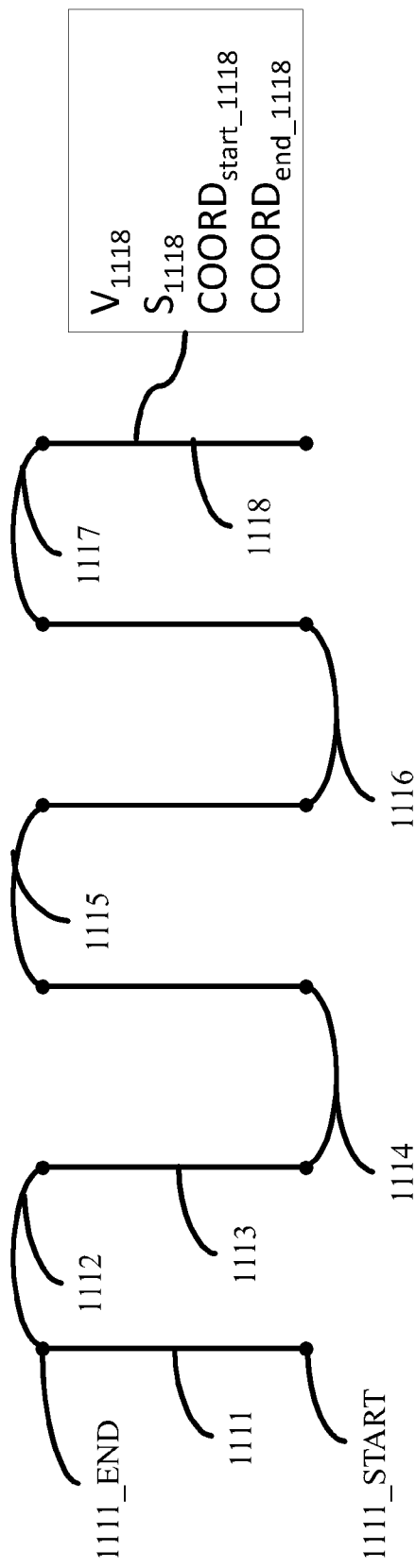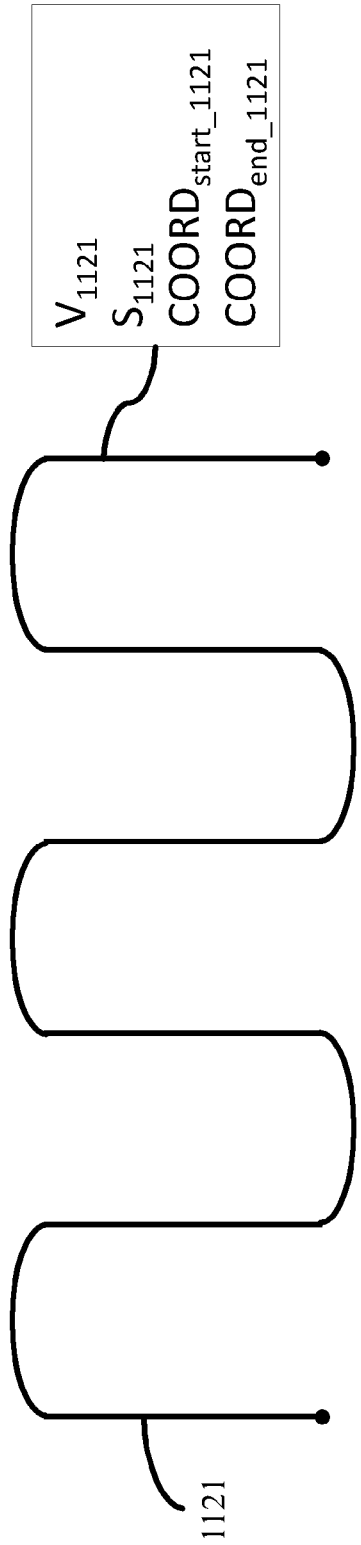
Fig. 11A
Fig. 11B

SYSTEM AND METHOD OF AN AGRICULTURAL MACHINE TO OPTIMISE WORKING CAPACITY

TECHNICAL FIELD

Embodiments of the invention relate generally to the technical field optimising the working capacity or utilisation of an agricultural machine. More specifically, embodiments of the invention relate to the coordination of agricultural machinery when refilling substance intended for dissemination over an agricultural field in order to estimate an optimum refill location, for example, when refilling seed for a seed drill or seeder.

BACKGROUND

Agricultural machinery is a collective name for machines used as tools in agriculture. The development of agricultural machinery aims to facilitate agricultural work for farmers farming an agricultural field. The agricultural machine, or a seed drill that can serve as an example of such a more general agricultural machine, is configured to distribute a substance, e.g., seeds, across agricultural fields. Modern versions of seed drills are normally towed or pulled by a motorised vehicle such as an agricultural vehicle, e.g., a tractor, and consist principally of a frame, a substance reservoir and a output/dosing system for seed which outputs seed via coulters into the agricultural fields. The dissemination of substance usually lasts only until the substance reservoir is nearly empty of substance; allowing the substance reservoir to be empty may result in uneven dissemination or distribution of substance. Especially in large farms, where a great number of agricultural machines are involved in the dissemination of substance, standstills occurring when the substance reservoir is nearly empty may lead to a substantial reduction of the potential working capacity and increased process costs. Therefore, there are a number of different approaches to replenish nearly empty substance reservoirs while working. One common such approach is that a user of another motorised vehicle, hereinafter called a refill vehicle, which may, for example, consist of a lorry having a substance reservoir or a tractor-towed wagon having a substance reservoir, equipped with a reservoir for substance, such as seed, is contacted by a user of a seed drill with a near empty seed substance reservoir, in order to meet at an agreed location in the agricultural fields, to replenish the seed drill's substance reservoir. A problem with known approaches is the lack of coordination of the vehicles, which causes the seed drill to remain stationary in the agricultural fields awaiting the arrival of the refill vehicle. Another problem is that the resolution of refill locations does not allow for optimum utilisation of the agricultural machine, but refilling is done too early or too late. Another problem that arises is that the refill vehicle occasionally travels across a sown area of the agricultural fields, ignorant of the seed drill's previous route, to reach the agreed location in the agricultural fields.

Therefore, there is a need for the coordination of agricultural machines for users of seed drills through a system and a method that minimises the loss of time when refilling seed and/or further prevents other vehicles, e.g., refill vehicles, from travelling across a sown agricultural field during, before or after refilling.

PRIOR ART

Examples of prior art are found in the following documents:

EP0878119 B1 discloses a method for control and management of seed drills, wherein data specific to the seed drill are stored in a computer depending on location and area. The method also includes a position sensor to provide the relative position of the machine in the area as well as a built-in computer to calculate the planning of the route, which is calculated for the purpose of determining the coordinate where it is rational to refill the machine's substance reservoir.

U.S. Ser. No. 05/666,793 discloses a method for the operation management of a combine harvester to optimise the yield of a harvest. The operation method is managed externally by an operator via a control processor containing reference data, and internally through continuous measurement and evaluation of actual data, such as the relative position coordinates of the combine harvester. The relative position coordinates and other data are continuously detected and stored in a historical data register, to which the control processor of the combine harvester has access. The basic principle of the method of operation management consists of the fact that the historical data register is used as the basis for obtaining new reference data intended to optimise the work process of a combine harvester.

US 20110084851 A1 discloses a system and a method for coordinating the refilling of a substance reservoir in an agricultural machine, the refill locations being selected from a static predefined set of refill locations. However, the method does not allow for optimum utilisation of the agricultural machine, as refilling is done too early or too late.

None of the known documents above present any solution to the identified technical problem.

SUMMARY

The dissemination of substance usually lasts only until the substance reservoir is nearly empty of substance; allowing the substance reservoir to be empty may result in uneven dissemination or distribution of substance. Especially in large farms, where a great number of agricultural machines are involved in the dissemination of substance, standstills occurring when the substance reservoir is nearly empty may lead to a substantial reduction of the potential working capacity, as well as increased costs and delay of the process. The purpose of the invention is to optimise the refill procedure by estimating the optimum refill location and refill time, thereby increasing the working capacity of an agricultural machine disseminating substance over an agricultural field. This is achieved through improved coordination of a substance-disseminating agricultural vehicle with a refill vehicle for refilling substance intended to be disseminated over an agricultural field, in a substance reservoir.

In particular, this is done by generating coordination data indicative of a predetermined geographical location and at a calculated point in time in order to optimise the working capacity by minimising the waiting time for refilling seed, and/or to prevent or reduce the risk of said refill vehicle for refilling seed travelling across an area where substance has already been disseminated over the agricultural fields.

A further advantage of the system is that connected vehicles can be monitored in order to also optimise other activities, such as the follow-up of covered agricultural fields, maintenance or replenishment of fuel.

According to one embodiment of a system and method of a system in an agricultural machine for coordinating agricultural machinery when refilling substance intended to be disseminated over an agricultural field in order to estimate an optimum refill location, comprising:

generating level data, said level data indicating a volume of a substance in a substance reservoir;
generating and storing position data, and storing a preplanned route;
transmitting and receiving data;
characterised by:
generating coordination data, based on said level data, said preplanned route and said position data.

According to one embodiment, which also comprises an interface device arranged to present data to a user and to receive user data based on an indication from a user.

According to one embodiment, wherein generating and transmitting coordination data are performed only after the interface device has received an indication from a user.

According to one embodiment, wherein said interface device comprises a tablet computer.

According to one embodiment, wherein generating and transmitting coordination data are performed automatically when the level data fall below a predefined threshold value.

According to one embodiment, wherein said level sensor generating level data also comprises a 3D laser adapted to calculate the volume in said substance reservoir.

According to one embodiment, wherein said level sensor generating level data also comprises a load sensor configured to generate level data indicative of the weight of the remaining substance in the substance reservoir.

According to one embodiment, wherein said level sensor generating level data also comprises a capacitive sensor configured to generate level data indicative of the volume of the remaining substance in the substance reservoir.

According to one embodiment, wherein said position sensor also comprises a Global Navigation Satellite System (GNSS) receiver.

According to one embodiment, wherein the coordination data comprise a selection of level data, stored and current position data, preplanned route and user data.

According to one embodiment, wherein the coordination data are generated based on an empirically planned route based on stored position data.

According to one embodiment, wherein the coordination data are generated based on a calculated preplanned route and on the dissemination area of the agricultural machine.

According to one embodiment, wherein the coordination data are generated based on an indication from a user.

BRIEF DESCRIPTION OF THE DRAWINGS

FIG. 11A shows an embodiment of a preplanned route comprising traverses consisting of vectors associated with data representing a specific associated geographical distance, a start coordinate, an end coordinate and an associated average speed. Each vector includes a start coordinate and an end coordinate.

FIG. 11B shows a further embodiment of a preplanned route comprising a traverse consisting of vectors associated with data representing a specific associated geographical distance, a start coordinate, an end coordinate and a common associated average speed.

DETAILED DESCRIPTION OF THE INVENTION

Definitions

Figure 1:
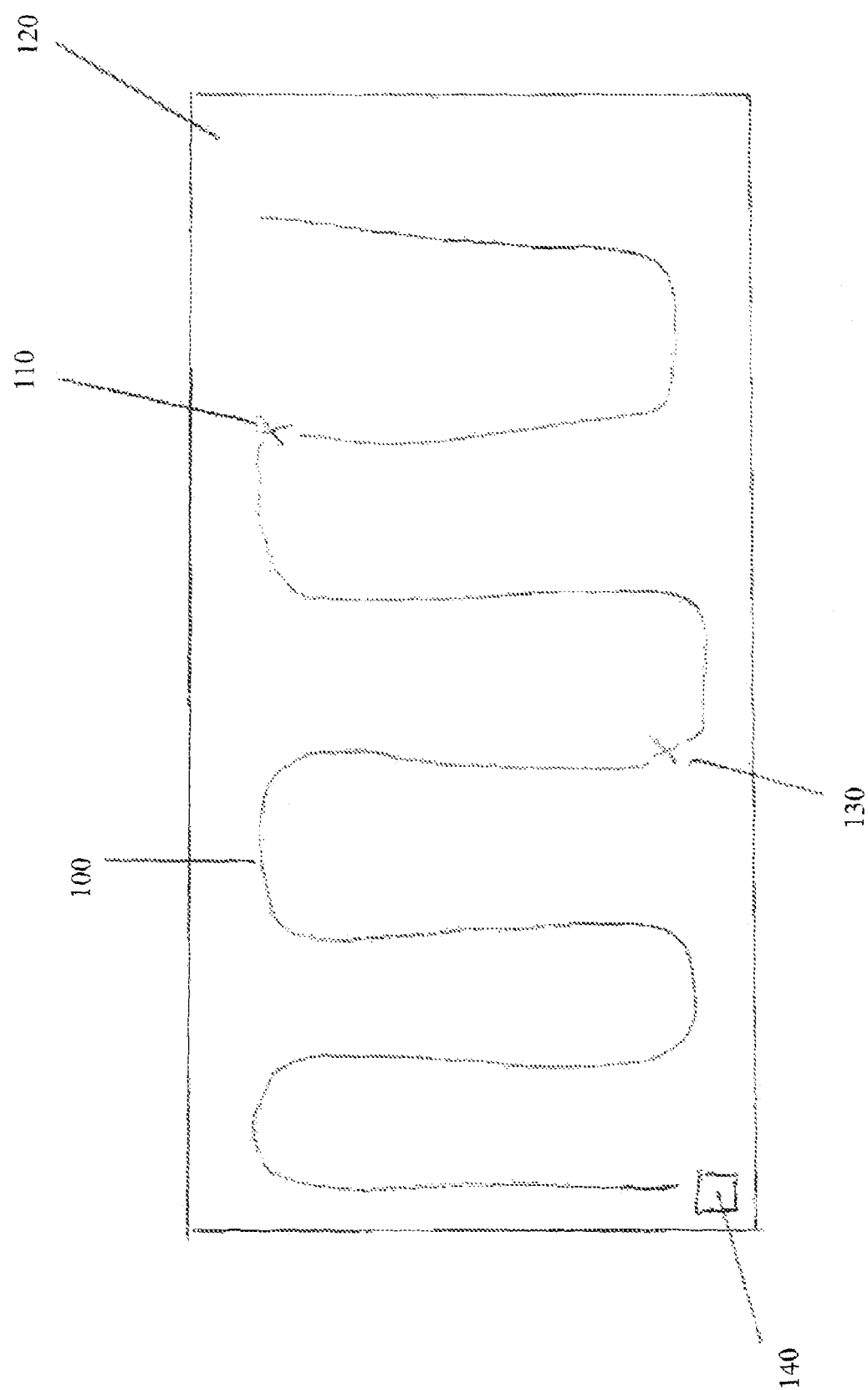
FIG. 1 shows an agricultural field and a preplanned route for the seed drill from a bird's perspective.

Agricultural machine shall herein be understood as a machine used as a tool in agriculture, adapted to move across agricultural fields. A seed drill may be an example of such a more general agricultural machine adapted for dissemination of substance over an agricultural field.

Working capacity shall herein be understood as a measure of work in relation to agricultural field performed per time unit; one example of working capacity may be the area over which substance can be disseminated per unit of time, e.g., hectares per hour. Another example is the time consumption for distributing seed over agricultural fields.

Level sensor shall herein be understood as a device for generating level data indicating the remaining quantity, or volume, of substance in the substance reservoir of a seed drill, e.g., the amount of remaining seed in a substance reservoir represented as level data represented by data values or an indication that the quantity is below a specific level.

Substance reservoir shall herein be understood as a storage space for a substance for the purpose of transporting or disseminating substance over an agricultural field.

Level data shall herein be understood as data values indicating remaining quantity, or volume, of substance in substance reservoir of a seed drill.

Position sensor shall herein be understood as a device for generating and storing position data indicating the current and previous position coordinates of an agricultural machine, and for storing a preplanned route indicative of an expected, recommended or estimated motion pattern for an agricultural machine across an agricultural field.

Position data, data values indicating the current and previous position coordinates of an agricultural machine, e.g., geographical position coordinates received from a communication network, such as a satellite communication network.

Preplanned route shall herein be understood as data values indicating an expected, recommended or estimated motion pattern, such as position coordinates with an associated average speed or vectors indicating a specific geographical distance with an associated average speed.

Interface device shall herein be understood as a device adapted to receive a user indication (input) from a user as user data or to present a graphical visualisation of data to a user based on level data, position data, preplanned route or coordination data.

Communication device shall herein be understood as a device for transmitting and receiving data from other communication devices, e.g., in order to transmit the coordination data of an estimated optimum refill location and point in time from a first agricultural machine to a refill vehicle. Examples of refill vehicles can be a lorry with a substance reservoir, or a tractor-towed trailer with a substance reservoir.

Coordination device shall herein be understood as a device for generating coordination data for the coordination of agricultural vehicles for optimising working capacity, e.g., estimated coordinates and an estimated point in time for an optimum refill location where two agricultural machines are coordinated to meet, such as a seed drill and a refill vehicle.

Coordination data shall herein be understood as data values indicating coordination of agricultural machines, e.g., estimated coordinates and an estimated point in time for an optimum refill location where two agricultural machines are coordinated to meet, such as a seed drill and a refill vehicle. In one embodiment, the coordination data also contain a selection of level data, stored and current position data, preplanned route and user data. In a further embodiment, coordination data are sent together with a selection of level data, stored and current position data, preplanned route and user data to a refill vehicle or central unit.

User data shall herein be understood as data values indicating an indication from a user via an interface device, e.g., in order to request coordination with another agricultural vehicle, to control the presentation of data or to update/change parameters in the system.

According to one embodiment, FIG. 1 shows an example of how a seed drill is driven along a preplanned route 120, where the route generally consists of a number of track logs along more or less straight lines and turning points, on the agricultural fields 100 in order to distribute substance, e.g., seed, with a predetermined even outflow of seed from a substance reservoir connected to the agricultural machine, e.g., the seed drill. On a first occasion, the seed drill arrives at the start location 140 on the selected agricultural fields 100 with a substance reservoir containing seed. The quantity of seed contained in the full substance reservoir is limited by the volume of the substance reservoir, which is not always sufficient to distribute the seed along the entire preplanned route 120 comprising the area of the agricultural fields 100 over which seed is to be distributed. At a first arbitrary coordinate 130, a level sensor in the substance reservoir of the seed drill signals to a user of the seed drill that level data are under a threshold value and that, consequently, the seed has reached a low level and that the substance reservoir therefore needs to be refilled. Through a communication device the seed drill sends coordinates of an estimated optimum refill location 110 and an estimated point in time, based on calculations, to a refill vehicle in order to meet at the optimum refill location and fill the substance reservoir of the seed drill with seed. The calculations may comprise, inter alia, empirical data from previous motion patterns, travelling patterns or routes of the agricultural machine across the agricultural fields 100. Furthermore, the calculations may also comprise a travelling pattern or route on the agricultural fields, where the preplanned route 120 is such an example with a given start position 140 and end position. These calculations are compiled to present a recommended route for the user of the seed drill in order to distribute seed across the agricultural fields 100. In order to also optimise the working capacity and hence the time consumption for distributing seed over the agricultural fields 100, said communication device transmits, inter alia, coordination data, such as an estimated geographical location as a position coordinate and a calculated/estimated point in time for the seed drill and the refill vehicle to meet at the optimum refill location 110. That way the seed drill does not need to waste time standing still waiting for the refill vehicle, but refilling can take place at the very moment when the seed drill arrives at the refill location 110, whereupon the distribution of seed on a remaining part of the agricultural fields 100 continues. This procedure for communication and refilling can be repeated an arbitrary number of times.

According to one embodiment, an optimum refill location for the seed drill and refill vehicle is situated so that the coordination between the vehicles entails no, minor, or negligible waiting time before refilling can commence and that the refill vehicle does not need to go over a sown area of agricultural fields to reach the refill location, as this sown area then risks being destroyed by the ground pressure of a refill vehicle. Furthermore, the optimum refill location is a geographical point where the substance kept in the substance reservoir of the agricultural machine is estimated to run out, leading to the substance reservoir not being unnecessarily refilled and the total number of refills being minimised.

Empirically Planned Route

According to one embodiment, the invention provides a method for calculating or generating coordination data as an optimum refill location based on an empirically planned route based on stored position data, e.g., the travelling pattern of a previous dissemination over the agricultural fields. The time remaining before the seed in the tank runs out, hereinafter called B-time, is obtained through level data from a level sensor measuring a volume or level of residual amount of seed in the substance reservoir connected to the seed drill. Empirical data from a previously traveled distance or route on the same agricultural fields on a previous occasion describes a travelling pattern or route, hereinafter called S-emp, are obtained, inter alia, from stored position data, such as GPS coordinates; and empirical data from a previous speed or average speed, hereinafter called V-emp, are obtained, inter alia, from stored speed or average speed associated with S-emp. Together, B-time, S-emp and V-emp are used as the basis of one or more predefined relationships, e.g., equations, which calculate an optimum refill location, according to the following simplified relationship:

Distance=$V$-emp×$B$-time, where Distance is a length dimension independent of the driving pattern Optimum refill location=$f(S$-emp,Distance$)$ That way an optimum meeting point is obtained/generated as an estimated coordinate for the optimum refill location and an estimated point in time for refilling, where the substance reservoir is expected to be nearly empty and in need of replenishment of seed. As mentioned above the reservoir must not be empty in order to avoid the risk of uneven dissemination, thereby degrading the quality of the dissemination, or the sowing.

In a non-limiting example, a preplanned route is obtained as an empirically preplanned route by storing the current position as GPS coordinates of an agricultural machine, e.g., a seed drill, as stored position data. A preplanned route can be generated as a traverse, consisting of vectors associated with data representing a specific associated geographical distance, a start coordinate, an end coordinate and an associated average speed. Vectors can be calculated from a first GPS coordinate and a subsequent GPS coordinate as a direction and a size in the form of an associated geographical distance. The associated geographical distance can be calculated as the Euclidean distance between a first GPS coordinate and a subsequent GPS coordinate. The associated average speed can be calculated based on the time difference between the generating time for a first GPS coordinate, the generating time for a subsequent GPS coordinate and said associated geographical distance, which would be understood by a person skilled in the associated fields of the art.

Calculated Planned Route

According to one embodiment, the invention provides a method for calculating or generating coordination data as an optimum refill location based on a calculated preplanned route generated based on the dissemination area of the agricultural machine and a predefined travelling pattern. As an example of a predefined travelling pattern, the agricultural machine moves in straight lines, so-called track logs, between the outer boundaries of an area where substance is to be disseminated, with the least possible overlap between the disseminated areas, and with a specific minimum turning radius. These parameters can then be used to lay out a preplanned route over the agricultural fields. The dissemination area of the agricultural machine during a given track log can be described as an area (a) representing a minimum area where substance is disseminated as the seed drill travels a track log. Furthermore the calculation is based on a second area, A representing a total area of the surface to be supplied with seed by the seed drill, e.g., an agricultural field. A user of the seed drill specifies parameter values representing the dissemination area of the seed drill and the area of the agricultural fields. Together, A and a are used as the basis for one or several equations calculating an optimum refill location based on a calculated preplanned route, according to the following simplified relationship:

$$A = B \times H$$

where B is the length of the short side of the agricultural land and H is the length of the long side of the agricultural land $$a = b \times h$$

where b is the working width of the seed drill, and h is the length of the track log Number of units of length = $A \div a$.

Based on the calculated areas and said number of units of length, the systems of the seed drill, e.g., the coordination device, can calculate and recommend a planned route in order to cover the entire agricultural fields with seed. For example, knowing A, B and H, the number of track logs A and their individual lengths can be calculated according to methods known to a person skilled in the art. As a minimum overlap between track logs is desirable, the working width b of the machine can be assumed to be the distances between track logs, and consequently, the minimum turning radius for the route's connection between track logs.

Combined with level data for a remaining seed quantity in the substance reservoir of the seed drill, coordination data as the optimum refill location can be calculated. For example, the number of track logs A and their lengths, a predefined substance flow per unit of distance and the quantity of substance in the reservoir can yield an estimated point in time when the substance reservoir will be nearly empty.

In a non-limiting example, a preplanned route is obtained as a calculated preplanned route by storing coordinates of said straight lines and curves corresponding to the curve radius. A preplanned route can be generated as a traverse, consisting of vectors associated with data representing a specific associated geographical distance, a start coordinate, an end coordinate and an associated average speed. Vectors can be calculated from a coordinate and a subsequent coordinate as a direction and a size in the form of an associated geographical distance. The associated geographical distance can be calculated as the Euclidean distance between a first coordinate and a subsequent coordinate. The associated average speed can be set to constant for all vectors based on a predefined value or on an indication from a user, which would be understood by a person skilled in the associated fields of the art.

User-Indicated Planned Route

According to one embodiment, the invention provides a method for calculating or generating coordination data as an optimum refill location based on an indication from a user of an agricultural machine. According to a further embodiment, the user specifies an indication representing user data as an optimum refill location as a position coordinate and a point in time. According to a further embodiment, the user specifies an indication representing user data as an optimum refill location as a position coordinate, wherein the coordination device calculates a point in time for the optimum refill location based on the planned route. According to a further embodiment, the user specifies an indication representing user data as an optimum refill location as a point in time wherein the coordination device calculates a position coordinate for the optimum refill location based on the planned route. According to a further embodiment, the user specifies an indication representing user data as an optimum refill location as a starting point, end point and preplanned route with an associated average speed wherein the coordination device calculates a point in time for the optimum refill location based on the indicated planned route.

According to a further embodiment, the user specifies the indication via an interface device in the seed drill which transmits user data to the coordination device.

According to a further embodiment, the user specifies the indication via an interface device in the refill vehicle which transmits user data to the coordination device via the communication network.

According to a further embodiment, the user specifies the indication via an interface device in the central unit which transmits user data to the coordination device via the communication network.

According to a further embodiment, a graphical visualisation of the agricultural fields is presented by the interface device when the user specifies the indication.

According to a further embodiment, a graphical visualisation of all the agricultural machines is presented within the graphical visualisation of the agricultural fields by the interface device when the user specifies the indication. For example, a user of the central unit, the seed drill or the refill vehicle can, via the interface device, detect that two vehicles are geographically close, and indicate an optimum refill location.

In one example, the user can, via a user interface, e.g., a touch screen, suggest a planned route and furthermore an optimum refill location directly on a graphical visualisation of an agricultural field.

According to one embodiment, the invention provides a method for calculating an optimum refill location based on a preplanned route, where the route is preplanned by a user of a central unit, which is then communicated via the communication network, e.g., a wireless network.

According to one embodiment, the invention provides a method for calculating or generating coordination data as an optimum refill location based on a preplanned route, where the route is predefined, e.g., downloaded from a third-party supplier via the communication network, read from a memory or carrier.

Method Embodiment

Figure 2:
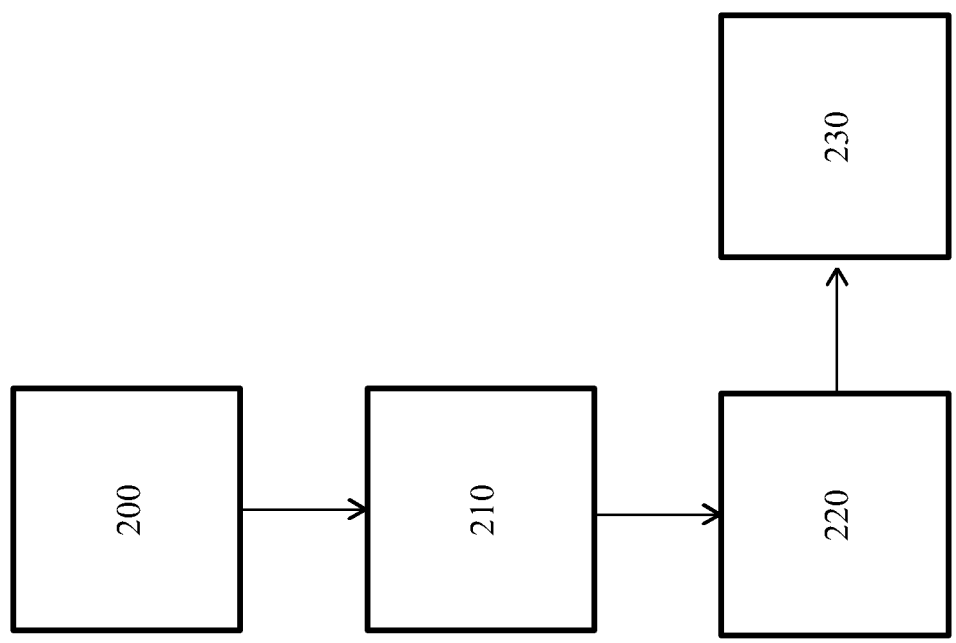
FIG. 2 shows the process steps of a method for optimising the working capacity, especially for the coordination of agricultural machinery when refilling substance intended to be disseminated over an agricultural field.

One embodiment of a method for optimising working capacity is shown schematically in FIG. 2. The method comprises a method of a system in an agricultural machine for the coordination of agricultural machines when refilling substance intended to be disseminated over an agricultural field in order to estimate an optimum refill location, the method comprising:
  generating level data 200, said level data indicating a volume of a substance in a substance reservoir;
  generating and storing position data;
  generating coordination data 240, based on said level data, said preplanned route and said position data;
  transmitting said generated coordination data to a refill vehicle;

In a further embodiment, where transmitting the coordination data is performed via a central unit.

In a further embodiment, where the method also comprises obtaining a preplanned route 210, e.g., by reading from a memory or carrier.

In a further embodiment, the method comprises:
  generating level data 200, said level data indicating a volume of a substance in a substance reservoir;
generating and storing position data, and storing a preplanned route 210;
  transmitting coordination data 220;
  generating coordination data 240, based on said level data, said preplanned route and said position data; In a non-limiting example, the level data is generated in a level sensor, indicating the remaining level, quantity or volume of substance in the substance reservoir of a seed drill. Level data are transmitted to a coordination device and alternatively to an interface device, where level data to the interface device are transmitted directly or via the coordination device. A position sensor generates the current position as position data, e.g., in the form of position coordinates, saves the current position, which, together with previous position data, comprises stored position data in a memory or media connected to the level sensor, and sends the position data and the stored preplanned route to a coordination device. The position coordinates can be obtained, e.g., from a Global Navigation Satellite System (GNSS). A coordination device generates coordination data, based on said level data, said preplanned route and said position data, alternatively stored position data. Coordination data can be generated by first obtaining, generating an estimated coordination time, e.g., B-time. The coordination time can be obtained as level data expressed in time units, by converting level data from a volume measure to a time measure via a table, by an indication from the user or in any other way known to a person skilled in the art. Coordination data in the form of an estimated coordination coordinate can then be obtained by identifying the current position on the preplanned route, simulating the preplanned route, with an associated average speed, up to the estimated coordination time, to there read an estimated coordination coordinate from the preplanned route. The coordination device can then send coordination data via the connected communication device to the communication device in the refill vehicle, where coordination data can then be presented on an interface device to the user of the refill vehicle.

According to one embodiment, which also comprises an interface device arranged to present level data to a user and to receive user data based on an indication from a user.

In a non-limiting example, level data are presented as a visual or graphical representation on an interface device to the user of the seed drill.

According to one embodiment, where generating and transmitting coordination data are performed only after the interface device has received an indication from a user.

In a non-limiting example, coordination data are generated and transmitted to the communication device in the refill vehicle only after the interface device has received an indication from a user. For example, after the user sees that level data represent a low level in the substance reservoir, the user issues instructions for sending coordination data to the communication device in the refill vehicle, where coordination data may be presented to the user of the refill vehicle.

According to one embodiment, wherein said level sensor generating level data also comprises a 3D laser sensor adapted to calculate the volume in said substance reservoir. In one embodiment, wherein said 3D laser sensor is configured to generate level data indicative of the weight of the remaining substance in the substance reservoir.

According to one embodiment, wherein said level sensor generating level data also comprises a load sensor configured to generate level data indicative of the weight of the remaining substance in the substance reservoir.

According to one embodiment, wherein said level sensor generating level data also comprises a capacitive sensor to calculate the volume in said substance reservoir.

According to one embodiment, wherein generating and transmitting coordination data are performed automatically when the level data fall below a predefined threshold value.

In a non-limiting example, coordination data are generated and transmitted to the communication device in the refill vehicle only after the coordination device has established that level data fall below a predefined threshold value indicating that, consequently, the substance or seed has reached a low level and that the substance reservoir therefore needs to be replenished. Coordination data are then sent to the communication device in the refill vehicle, where the coordination data may be presented to the user of the refill vehicle.

In a non-limiting example, a low level comprises 0-20% of the value of level data corresponding to a full substance reservoir.

According to one embodiment, wherein said interface device comprises a tablet computer. According to a further embodiment, the interface device is arranged to graphically present data to the user.

In a non-limiting example, a second communication device, position sensor, coordination device and communication device are contained in a tablet computer, portable computer, smartphone or other handheld computer device.

According to one embodiment, wherein said position sensor also comprises a Global Navigation Satellite System (GNSS) receiver.

In a non-limiting example, said position sensor comprises a Global Navigation Satellite System (GNSS) receiver and position data.

According to one embodiment, wherein generating coordination data is based on an indication from a user.

In a non-limiting example, the user specifies a suitable coordination coordinate, e.g., along the preplanned route, wherein a coordination time is calculated based on the preplanned route and its associated average speed.

According to one embodiment, wherein the coordination data comprise a selection of level data, stored and current position data, preplanned route and user data.

According to one embodiment, transmitting said generated coordination data to a refill vehicle includes that an estimated time value and an estimated coordinate for an optimum refill location are transmitted to a refill vehicle.

According to a further embodiment, transmitting said generated coordination data to a refill vehicle includes that also a selection of level data, stored and current position data, preplanned route and user data are transmitted to a refill vehicle.

According to one embodiment, wherein coordination data are generated based on empirical data.

In a non-limiting example, coordination data are calculated based on a preplanned route based on stored position data, e.g., a previous run on the same agricultural field.

According to one embodiment, wherein coordination data are generated based on a calculated preplanned route and on the dissemination area of the agricultural machine.

In a non-limiting example, coordination data are generated based on a calculated preplanned route which lays out a pattern' or travelling pattern over the area of the agricultural fields, the travelling pattern being based on the agricultural machine normally driving along straight lines with a distance between the lines which is correlated to the working width or dissemination width of the seed drill and with a curve or turning radius which is also correlated to the dissemination width of the seed drill.

According to one embodiment, wherein coordination data are generated based on an indication from a user of an agricultural machine.

According to one embodiment, wherein transmitting coordination data takes place by Short Message Service (SMS) via the wireless communication network.

According to one embodiment, wherein transmitting coordination data takes place by Multimedia Messaging Service (MMS) via the wireless communication network.

In some contexts the method may also comprise offsetting generated coordination data along the preplanned route based on additional aspects, such as offsetting an estimated point in time and estimated coordinates of an optimum refill location to turning points between track logs at the outer edge of an agricultural field, also called the headland.

In a further embodiment, the method for the coordination of agricultural machines when refilling substance intended to be disseminated over an agricultural field also comprises: offsetting generated coordination data along the preplanned route to turning points between track logs at the outer edge of an agricultural field, also called the headland.

Figure 6:
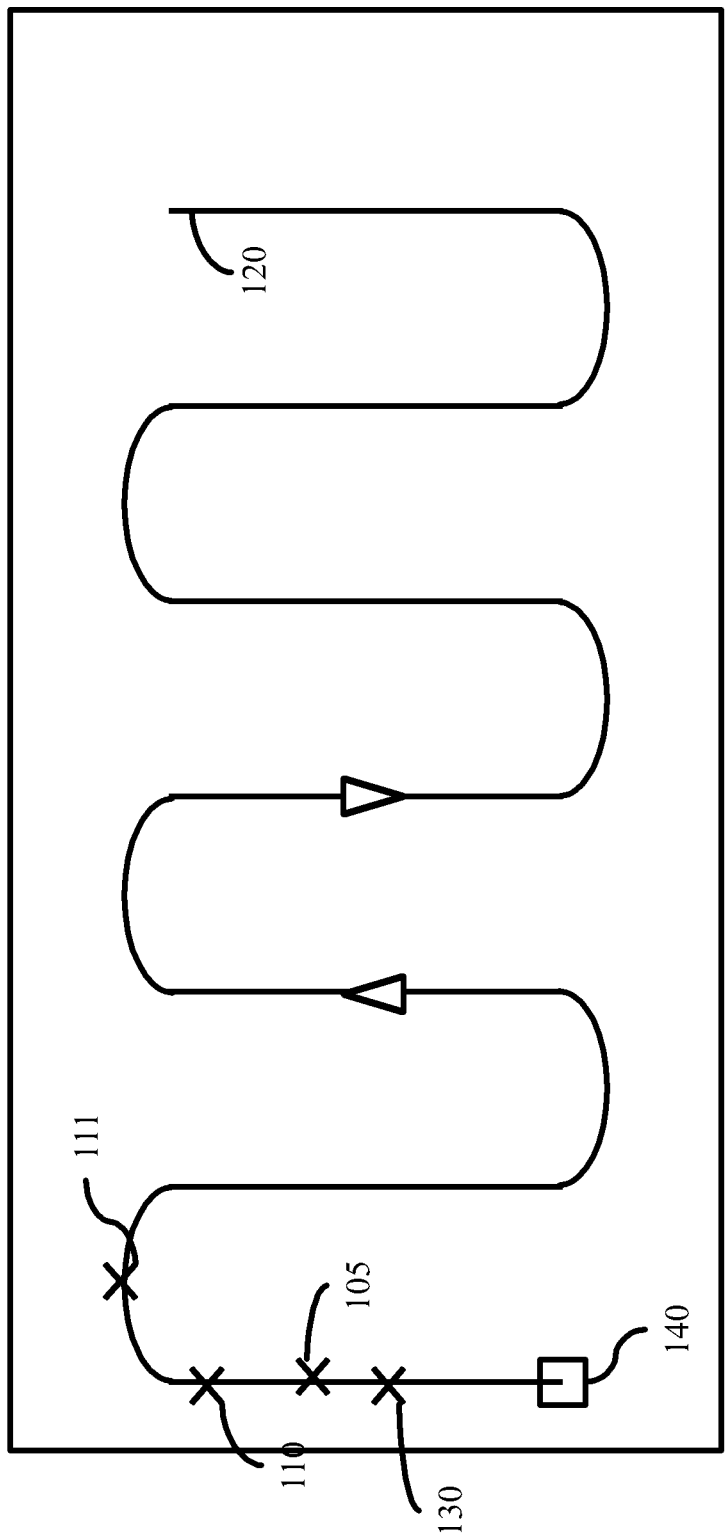
FIG. 6 shows an embodiment where a seed drill is driven along a preplanned route, where an instance of coordination data is generated.

FIG. 6 shows an embodiment where a seed drill is driven along a preplanned route 120 with a start position 140. At a first coordinate 130, level data are generated under a predefined threshold value indicating a low level, wherein said level data indicate a volume of a substance in a substance reservoir. At a second coordinate 105, position data corresponding to the current position of the seed drill are generated and stored; coordination data are generated, based on said level data, said preplanned route and said position data, where coordination data consist of at least one estimated coordination time and estimated coordination coordinate 110; turning points between track logs in the preplanned route are identified; generated coordination data are offset along the based route to a selected turning point 111 among the identified turning points. In one embodiment, a turning point is selected before said coordination coordinate 110 along the preplanned route. In a further embodiment, a turning point 111 is selected after said coordination coordinate 110 along the preplanned route.

In a further embodiment of the method of a system in an agricultural machine, e.g., a seed drill, for the coordination of agricultural machines when refilling substance intended to be disseminated over an agricultural field in order to estimate an optimum refill location, the method also comprises:
 identifying turning points between track logs of the preplanned route 120;
 offsetting generated coordination data along the based route to an identified turning point in, where coordination data consist of at least one estimated coordination time and estimated coordination coordinate.

Multiple Alternative Coordination Data Values or Instances of Coordination Data

In some embodiments, a refill vehicle serves several disseminating agricultural machines, e.g., several seed drills. In situations where the coordination data of a first disseminating agricultural machine, such as a seed drill, indicate a first coordination coordinate and a first coordination time too much geographically separated from the coordination data of a second disseminating agricultural machine, such as a seed drill, in order to be able to serve the first disseminating agricultural machine as well as the second disseminating agricultural machine at the first and the second coordination time respectively.

In a further embodiment of the method of a system in an agricultural machine, e.g., a seed drill, for the coordination of agricultural machines when refilling substance intended to be disseminated over an agricultural field in order to estimate an optimum refill location, the method also comprises:
generating coordination data comprising multiple priority-sorted instances of at least estimated coordination time and estimated coordination coordinate, e.g., a primary refill location, a secondary refill location and a tertiary refill location.

Figure 7:
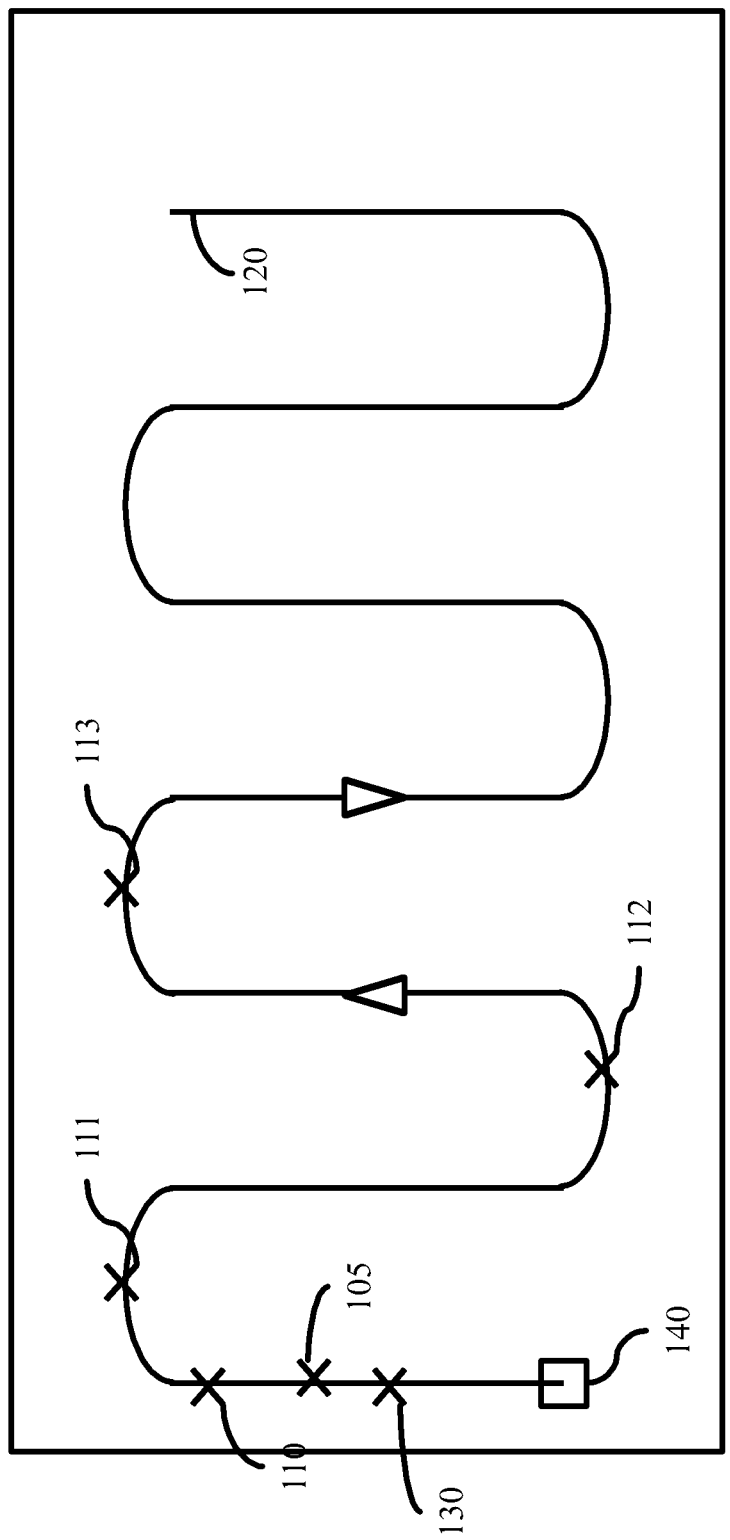
FIG. 7 shows an embodiment where a seed drill is driven along a preplanned route, where multiple instances of coordination data are generated.

FIG. 7 shows an embodiment where a seed drill is driven along a preplanned route 120 with a start position 140. At a first coordinate 130, level data are generated under a predefined threshold value indicating a low level, wherein said level data indicate a volume of a substance in a substance reservoir. At a second coordinate 105, position data corresponding to the current position of the seed drill are generated and stored; multiple instances 110, 111, 112, 113 of coordination data are generated, based on said level data, said preplanned route and said position data, where coordination data consist of at least one estimated coordination time and estimated coordinate 110.

In a further embodiment of the method of a system in an agricultural machine, e.g., an agricultural machine, for the coordination of agricultural machines when refilling substance intended to be disseminated over an agricultural field in order to estimate an optimum refill location, wherein generating coordination data includes generating multiple instances of priority-sorted coordination data, e.g., describing a primary refill location, a secondary refill location and a tertiary refill location.

In one embodiment, multiple instances of coordination data are generated by stepping said generated level data with predefined steps against level data corresponding to an empty substance reservoir. For example, level data corresponding to a low level are generated from 20%. Multiple instances of coordination data are generated for level data indicating a substance reservoir filled to 15%, 10% and 5% or any other applicable step size. The coordination time is obtained as level data expressed in time units, by converting level data from a volume measure to a time measure via a table and consequently obtaining multiple coordination times.

In a further embodiment, wherein generating multiple instances of coordination data comprises stepping said generated level data with predefined steps against level data corresponding to an empty substance reservoir and obtaining multiple coordination times by converting level data from a volume measure to a time measure via a table.

When disseminating substance over an agricultural field, the desired end result is commonly a number of particles, e.g., seeds, per unit of area. The number of particles in a substance reservoir is given, as described above, by a level sensor as level data, and may be expressed in units such as number, volume or weight.

Figure 8:
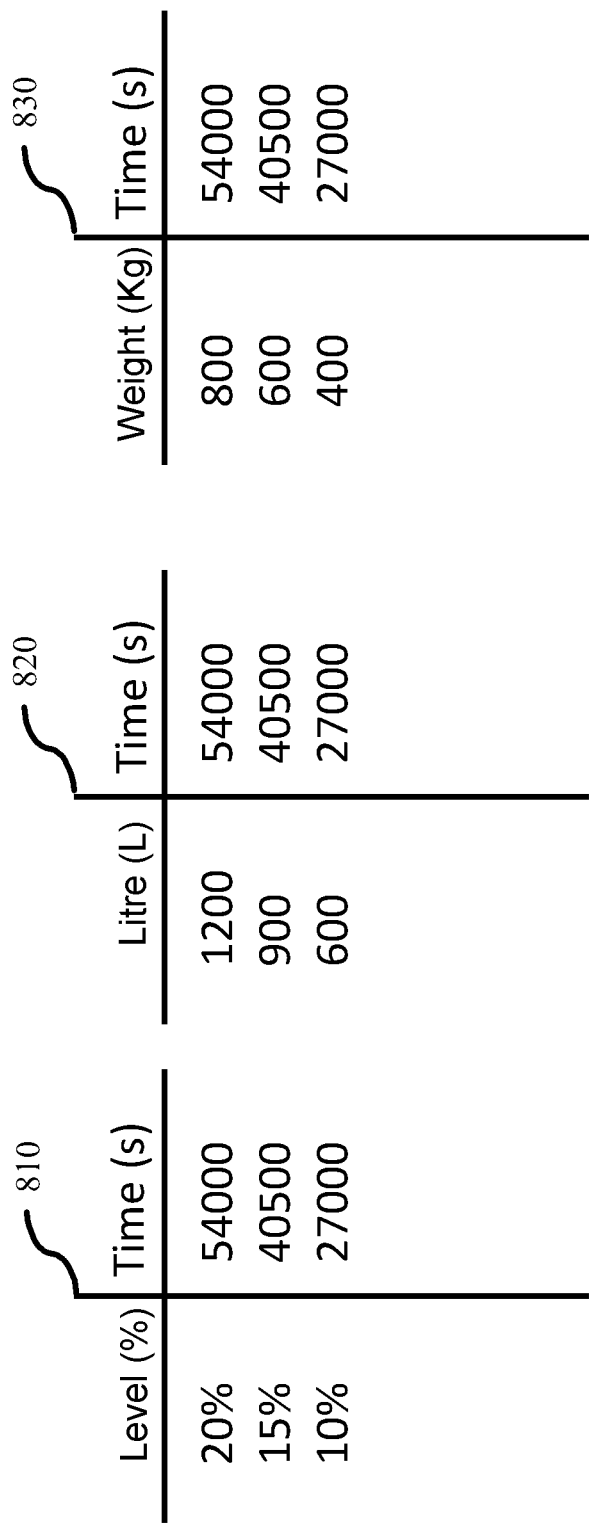
FIG. 8 shows embodiments of a table for converting level data from a volume measure to a time measure.

FIG. 8 shows a first embodiment of a table 810 for converting level data from a volume measure to a time measure, where the volume measure is expressed as level data in percent (%) of filling in relation to a full substance reservoir. FIG. 8 also shows a second embodiment of a table 820 for converting level data from a volume measure to a time measure, where the volume measure is expressed as level data in remaining liters in the substance reservoir. FIG. 8 also shows a second embodiment of a table 830 for converting level data from a volume measure to a time measure, where the volume measure is expressed as level data in remaining kilograms in the substance reservoir. In a further embodiment, values in the table are compensated with an output compensation term so that the time value in the table is increased by the time period when output of substance is turned off, e.g., at a turning point. This way the precision of the method is further improved, in particular when the turning points are close together.

In a further embodiment, wherein generating multiple instances of coordination data comprises identifying turning points between track logs along the preplanned route, a subset of the turning points is selected, e.g., by first generating a nominal instance of coordination data, see FIG. 7 110, and subsequently selecting three turning points right before or right after, see FIG. 7 111, 112, 113, said nominal instance of coordination data.

Figure 9:
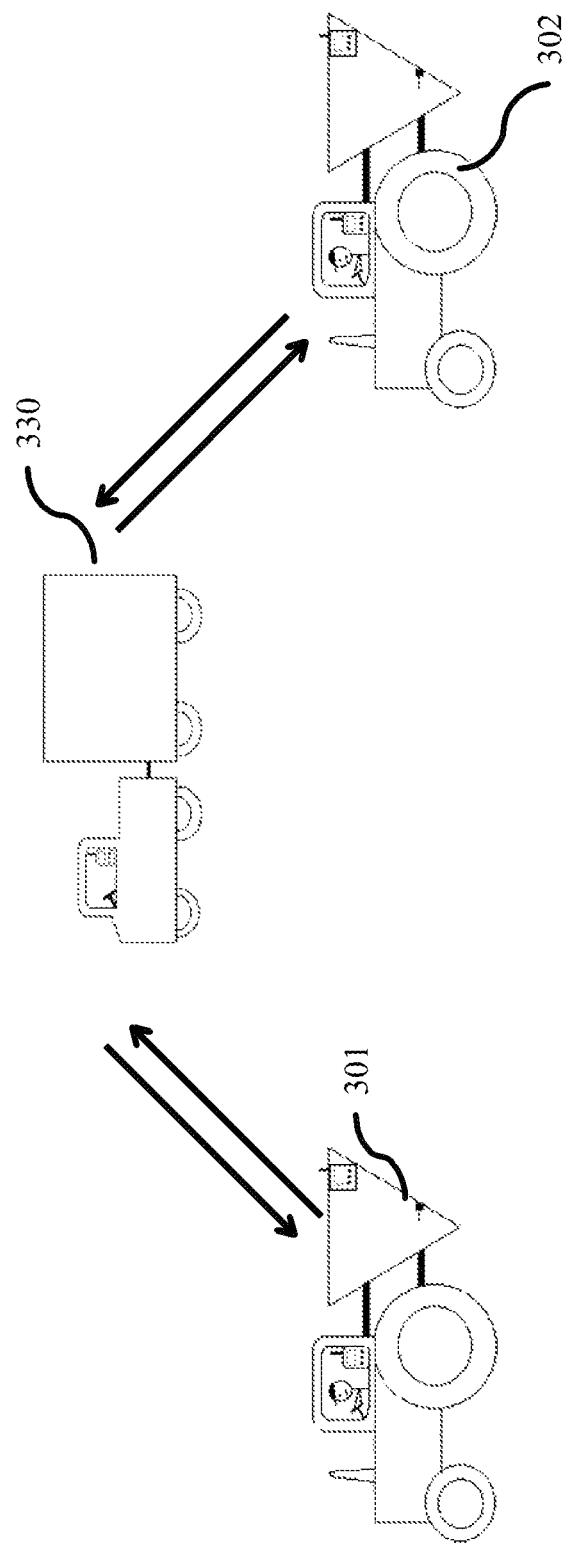
FIG. 9 shows a further embodiment where a refill vehicle serves a first disseminating agricultural machine, e.g. a seed drill, and a second disseminating agricultural machine for refilling substance in a substance reservoir, where the communication device in a refill vehicle sends a first instance of coordination data to the first disseminating agricultural machine and sends a second instance of coordination data to the second disseminating agricultural machine to confirm the selected refill locations.

FIG. 9 shows a further embodiment where a refill vehicle 330 serves a first disseminating agricultural machine 301, e.g., a seed drill, and a second disseminating agricultural machine 302 for refilling substance in substance reservoirs. The first disseminating agricultural machine 301 generates a first set of multiple instances of coordination data, e.g., describing a primary refill location, a secondary refill location and a tertiary refill location, and sends the coordination data, containing said multiple instances of the coordination data, to said refill vehicle 330. The second disseminating agricultural machine 302 generates a second set of multiple instances of coordination data, e.g., describing a primary refill location, a secondary refill location and a tertiary refill location, and sends the coordination data, containing said multiple instances of the coordination data, to said refill vehicle 330. A communication device, see FIG. 4 420, selects a first instance of coordination data from said first set, and selects a second instance of coordination data from said second set allowing the refill vehicle 330 to refill substance in a substance reservoir of said first disseminating agricultural machine 301 at a first refill location indicated by said first instance of coordination data, move to a second refill location indicated by said second instance of coordination data, and refill substance in a substance reservoir of said second disseminating agricultural machine 302. In one embodiment it is determined that it is possible, by comparing estimated driving time from a coordination coordinate in said first instance of coordination data to a coordination coordinate in said second instance of coordination data with the difference between the coordination time in said first instance of coordination data and the coordination time in said second instance of coordination data. In a further embodiment, the communication device in the refill vehicle 330 sends said first instance of coordination data to the first disseminating agricultural machine 301 and sends said second instance of coordination data to the second disseminating agricultural machine 302 in order to confirm the selected refill locations.

One embodiment of a method of a system in a refill vehicle 330 for the coordination of agricultural machines when refilling substance intended to be disseminated over an agricultural field in order to estimate an optimum refill location, the method comprising:

receiving coordination data comprising a first set of multiple instances of coordination data, e.g., describing a primary refill location, a secondary refill location and a tertiary refill location, from a first disseminating agricultural machine 301;

receiving coordination data comprising a second set of multiple instances of coordination data, e.g., describing a primary refill location, a secondary refill location and a tertiary refill location, from a second disseminating agricultural machine 302;

selecting a first instance of coordination data from said first set, and selecting a second instance of coordination data from said second set;

sending said first instance of coordination data to the first disseminating agricultural machine 301 and sending said second instance of coordination data to the second disseminating agricultural machine 302 in order to confirm the selected refill locations.

Figure 10:
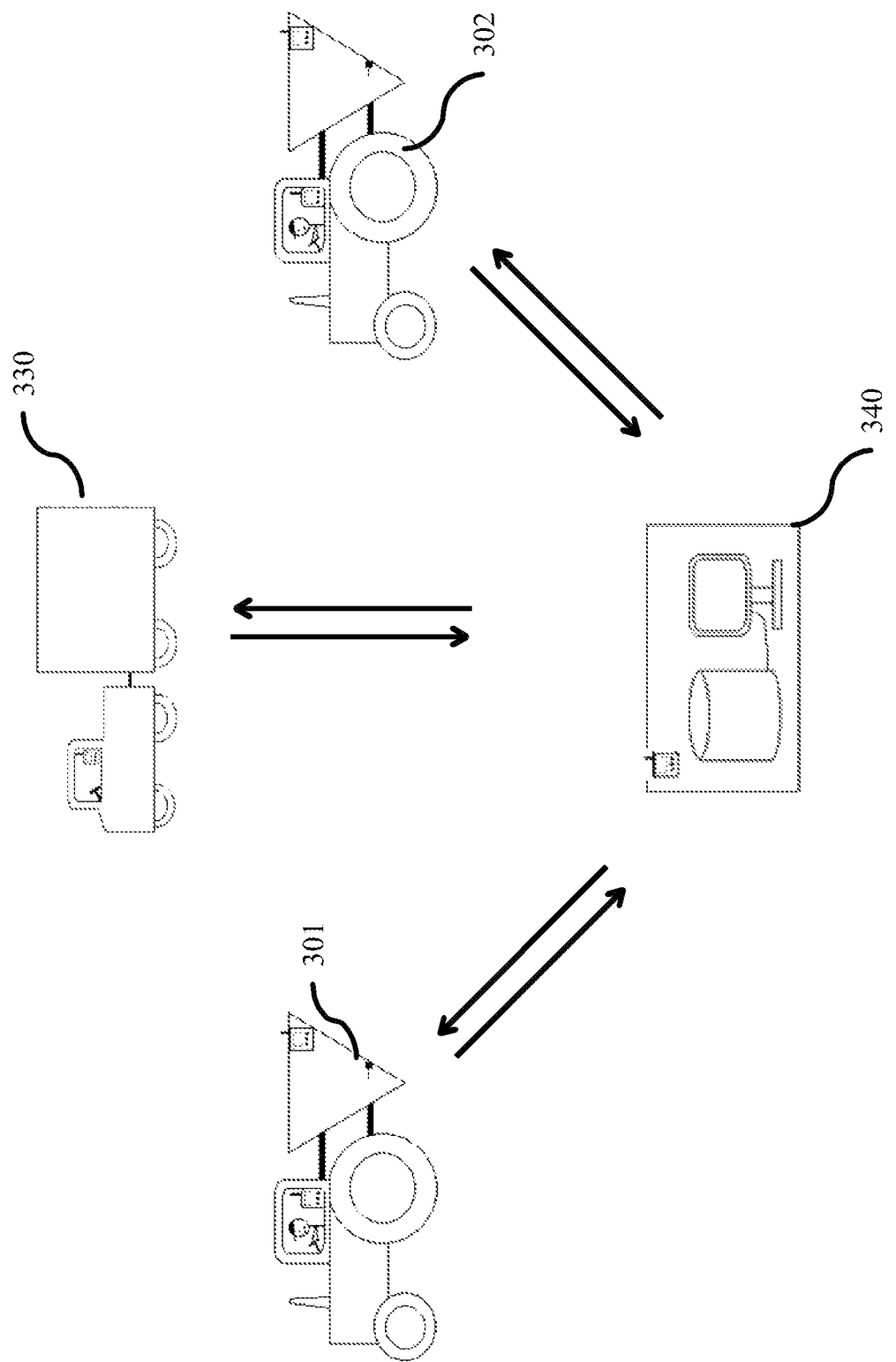
FIG. 10 shows a further embodiment where a filler vehicle serves a first disseminating agricultural machine, such as a seed drill, and a second disseminating agricultural machine for refilling substance in a substance reservoir, where the central unit sends a first instance of coordination data to the first disseminating agricultural machine and sends a second instance of coordination data to the second disseminating agricultural machine to confirm the selected refill locations.

In one embodiment of the method of a system in an agricultural machine for the coordination of agricultural machines when refilling substance intended to be disseminated over an agricultural field in order to estimate an optimum refill location, wherein coordination data transmitted to the refill vehicle comprise a first set of multiple instances of coordination data, e.g., describing a primary refill location, a secondary refill location and a tertiary refill location, the method also comprising:

receiving a first instance of coordination data in order to confirm the selected refill location;

FIG. 10 shows a further embodiment where a refill vehicle 330 serves a first disseminating agricultural machine 301, e.g., a seed drill, and a second disseminating agricultural machine 302 for refilling substance in substance reservoirs. A central unit is also communicatively connected to said refill vehicle 330, said first disseminating agricultural machine 301 and said second disseminating agricultural machine 302. The first disseminating agricultural machine 301 generates a first set of multiple instances of coordination data, e.g., describing a primary refill location, a secondary refill location and a tertiary refill location, and sends the coordination data, containing said multiple instances of the coordination data, to said central unit 340. The second disseminating agricultural machine 302 generates a second set of multiple instances of coordination data, e.g., describing a primary refill location, a secondary refill location and a tertiary refill location, and sends the coordination data, containing said multiple instances of the coordination data, to said central unit 340. The central unit, more specifically a processor in the central unit, selects a first instance of coordination data from said first set, and selects a second instance of coordination data from said second set allowing the refill vehicle 330 to refill substance in a substance reservoir of said first disseminating agricultural machine 301 at a first refill location indicated by said first instance of coordination data, move to a second refill location indicated by said second instance of coordination data, and refill substance in a substance reservoir of said second disseminating agricultural machine 302. In one embodiment, it is determined that it is possible, by comparing estimated driving time from a coordination coordinate in said first instance of coordination data to a coordination coordinate in said second instance of coordination data with the difference between the coordination time in said first instance of coordination data and the coordination time in said second instance of coordination data. In another embodiment, it is determined that it is possible by receiving an indication from a user of the unit 340 as an indication signal from an interface device. In a further embodiment, the central unit 340 sends said first instance of coordination data to the first disseminating agricultural machine 301 and to the refill vehicle 330, sends said second instance of coordination data to the second disseminating agricultural machine 302 and to the refill vehicle 330 in order to confirm the selected refill locations.

Figure 3:
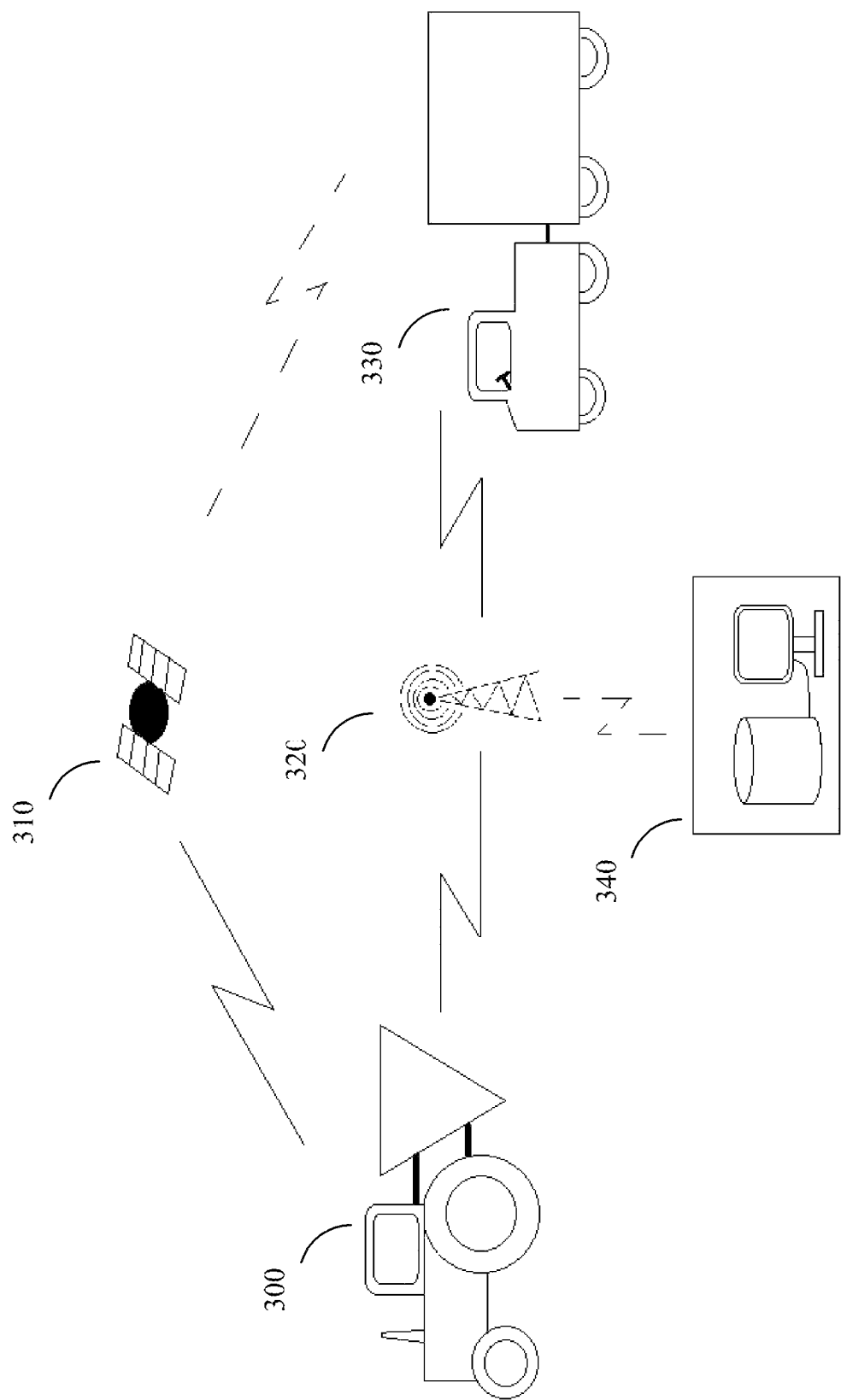
FIG. 3 shows an embodiment of the invention, where data are communicated between devices of the system, e.g., between a seed drill and a refill vehicle.

According to embodiments of the invention, FIG. 3 is an example of a system for an agricultural machine for the coordination of agricultural machines when refilling substance intended to be disseminated over an agricultural field in order to estimate an optimum refill location, e.g., seed for a seed drill, where the system is based on communication via one or several communication networks. The system comprises a first agricultural machine 300 comprising a communication device, e.g., a seed drill, a refill vehicle 330 comprising a communication device, e.g., a refill vehicle, an optional central unit 340 comprising a communication device, a communication node in a wireless communication network 320 and a communication node in a satellite communication network 310, e.g., a communication satellite or navigational system satellite, e.g., a Global Navigation Satellite System (GNSS), Global Positioning System (GPS), ГЛОНАСС Глобальная навигационная спутниковая система, Globalnaja navigatsionnaja sputnikovaja sistema (GLONASS), Galileo or Compass Navigation Satellite System (CNSS) satellite. According to a further embodiment, the first agricultural vehicle 300, e.g., a seed drill, and the second agricultural machine 330, e.g., a refill vehicle, are communicatively connected via a satellite communication network 310, e.g., a Global Navigation Satellite System (GNSS) to transmit and receive data between agricultural machines and central unit(s) in the system, or receive positioning information such as signals representing position data, and/or a wireless communication network 320 to transmit and receive data between agricultural machines and central unit(s) in the system, according to methods known to a person skilled in the art.

According to one embodiment, a preplanned route can be input through indications by a user to an interface device integrated in the central unit 340, by a user to an interface device in the first agricultural machine 300 or a user to an interface device in the refill vehicle 300.

In one embodiment, the wireless communication network is one of Local Area Network (LAN), Metropolitan Area Network (MAN), Global System for Mobile Network (GSM), Enhanced Data GSM Environment (EDGE), High Speed Downlink Packet Access (HSDPA), Wideband Code Division Multiple Access (W-CDMA), Code Division Multiple Access (CDMA), Time Division Multiple Access (TDMA), Bluetooth®, Zigbee®, Wi-Fi, Voice over Internet Protocol (VoIP), LTE Advanced, IEEE802.16m, WirelessMAN-Advanced, Evolved High-Speed Packet Access (HSPA+), 3GPP Long Term Evolution (LTE), Mobile WiMAX (IEEE 802.16e), Ultra Mobile Broadband (UMB) (formerly Evolution-Data Optimized (EV-DO) Rev. C), Fast Low-latency Access with Seamless Handoff Orthogonal Frequency Division Multiplexing (Flash-OFDM), High Capacity Spatial Division Multiple Access (iBurst®) and Mobile Broadband Wireless Access (MBWA) (IEEE 802.20) systems, High Performance Radio Metropolitan Area Network (HIPERMAN), Beam-Division Multiple Access (BDMA), World Interoperability for Microwave Access (Wi-MAX) and ultrasonic communication, etc., but is not limited to these but can be any communication network known to a person skilled in the art.

Figure 4:
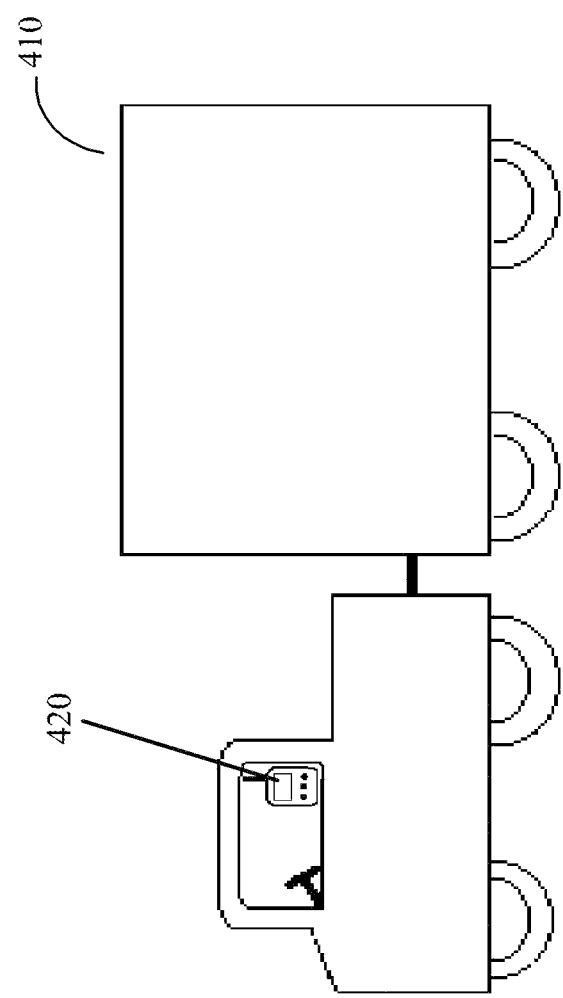
FIG. 4 shows a refill vehicle equipped with a substance reservoir and a communication device.

According to one embodiment, FIG. 4 shows schematically how a second agricultural machine, e.g., a refill vehicle, with a substance reservoir 410 for storing a substance, e.g., seed, and a communication device 420 for communicating via said satellite communication network and/or said wireless communication network. The substance reservoir 410 comprises a sealable opening through which a substance of any physical state can be input into and output from the substance reservoir 410 using any method apparent to a person skilled in the art. The communication device 420 includes an ability to receive data, e.g., coordination data, from said first agricultural machine, e.g., the seed drill, in order to present received data through a graphical visualisation interpretable for a user of the second agricultural machine, e.g., the refill vehicle. FIG. 1 is one example out of several possible of the graphical visualisation of received data from the seed drill. This example presents a visualisation of an agricultural field, from a bird's perspective, over which has been distributed a substance by a seed drill, and a started preplanned route with clear information about which parts of the agricultural fields have received the substance and which parts of the agricultural fields remain for distribution of the substance. That way the user of the refill vehicle sees the assigned refill location on the agricultural fields and the started planned route via a graphical interface, e.g., a display.

According to one embodiment, a system in a central unit for the coordination of agricultural machines when refilling substance intended to be disseminated over an agricultural field by generating coordination data indicative of an optimum refill location, the system containing:
a communication device communicatively connected to a processor and configured to receive or transmit data via a communication network;
a processor;
a memory;
an interface device communicatively connected to said processor and configured to receive an indication from the user as data and to present data to a user on a display.

Figure 5:
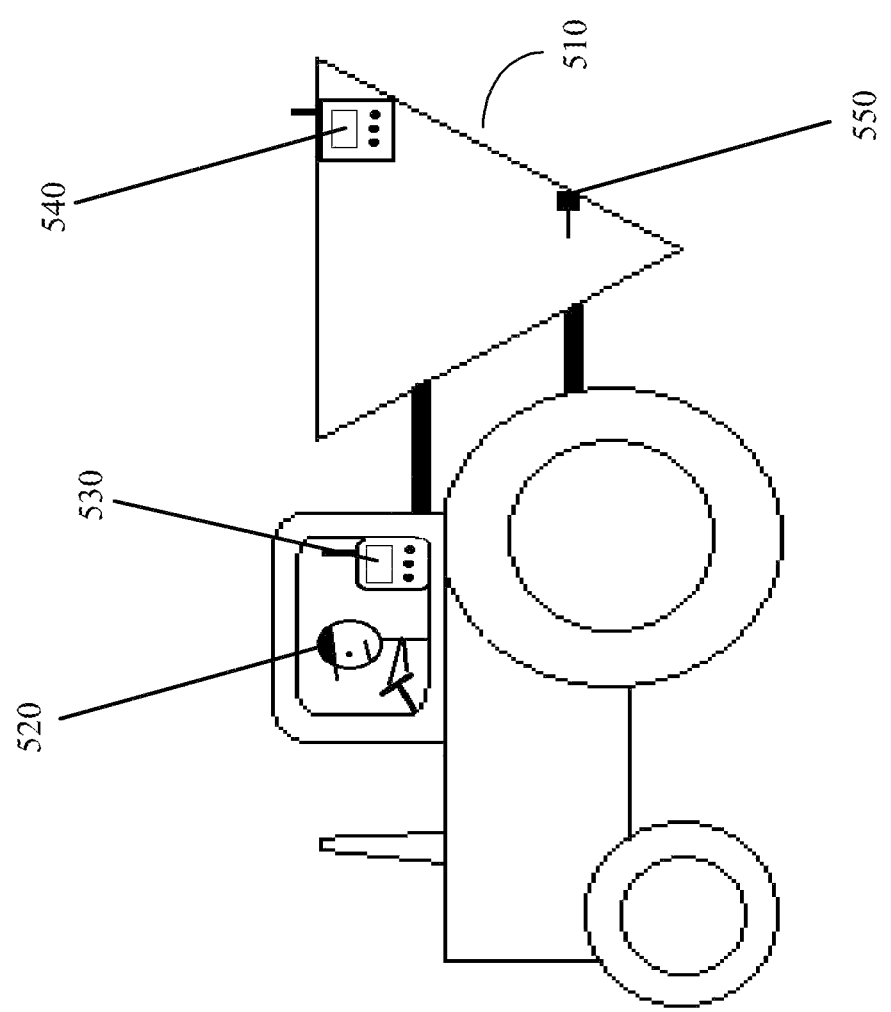
FIG. 5 shows a seed drill equipped with a substance reservoir and communication devices.

According to embodiments of the invention, FIG. 5 is an example of a seed drill with a substance reservoir 510 to store a substance, e.g., seed, and to output the substance via coulters into the agricultural fields. The seed drill comprises a level sensor 550 generating level data as a remaining quantity or level of remaining substance in the substance reservoir 510 with regard to the contents of the substance reservoir. When the remaining quantity of substance reaches a predetermined level indicating a low quantity of remaining substance in the substance reservoir 510 by level data falling below a predefined threshold value, level data are signalled via a first communication device 540 in the substance reservoir to a second communication device 530, available to a user 520 of the seed drill, whereupon said level data are shown on a display/user interface of an interface device. A position sensor and a coordination device are also available in the seed drill, and are communicatively connected via a communication network to said level sensor, first communication device 540, second communication device 530 and via the same or an alternative communication network to a communication device in a refill vehicle. The communication network(s) may comprise any communication network available to a person skilled in the art, e.g., for wired or wireless transmission. In an example where the user 520, through presentation of data, e.g., level data, on a display/user interface, has been notified of the low quantity of remaining substance in the substance reservoir 510, data values are sent in the form of coordination data from the second communication device 530 to a communication device in a refill vehicle. Coordination data may in one embodiment comprise a selection of level data, stored and current position data, preplanned route and user data, such as estimated position coordinates of an optimum refill location on or outside the agricultural fields where the seed drill meets the refill vehicle, coordinates of traveled route on the agricultural fields, as stored position data, and a calculated point in time for the meeting between the seed drill and the refill vehicle at the optimum refill location.

According to one embodiment of the invention, wherein generating and transmitting coordination data are performed only after the interface device has received an indication from a user.

In one example, said generated coordination data are sent from the second communication device in the seed drill to the communication device in the refill vehicle only when the user indicates, via a user interface of the interface device that (s)he approves transmission, or after (s)he has manually specified a location, wherein an estimated point in time for coordination is calculated based on a manually specified location along the preplanned route, the preplanned route according to previously described methods; see above for a description of time, route and average speed (B-time, S-emp and V-emp). The interface device then sends user data indicating the user indication to the coordination device, which generates coordination data, sends the generated coordination data to the communication device, which sends the coordination data to the communication device in a refill vehicle.

According to one embodiment of the invention, wherein generating and transmitting coordination data are performed automatically when the level data fall below a predefined threshold value.

In one example, the level sensor detects that level data fall below a predefined threshold value, indicating a low quantity of remaining substance in the substance reservoir, level data are signalled via a first communication device in the substance reservoir to a second communication device available to a user 520 of the agricultural machine, e.g., the seed drill, which sends level data to the coordination device, which automatically generates coordination data, sends the generated coordination data to the communication device, which sends the coordination data to the communication device in a refill vehicle for presentation to a user.

In a further example, level data are signalled via a first communication device in the substance reservoir to a second communication device available to a user 520 of the agricultural machine, e.g., the seed drill, which sends level data to the coordination device, which detects if level data fall below a predefined threshold value, indicating a low quantity of remaining substance in the substance reservoir and only thereafter automatically generates coordination data, sends the generated coordination data to the communication device, which sends the coordination data to the communication device in a refill vehicle.

According to one embodiment of the invention, said data are sent from the second communication device in the seed drill to the communication device in the refill vehicle manually through an indication from the user of the seed drill. The indication may be received via an interface device, e.g., a touch screen, which is available to the user of the seed drill, e.g., by being an integrated part of the second communication device.

According to one embodiment, the level sensor contains control logics, e.g., in the form of a processor, and a memory, media or carrier with a computer program stored thereon, the computer program being adapted to cause a processor to control the steps according to the method described above.

According to one embodiment, the position sensor contains control logics, e.g., in the form of a processor, and a memory, media or carrier with a computer program stored thereon, the computer program being adapted to cause a processor to control the steps according to the method described above.

According to one embodiment, the communication device contains control logics, e.g., in the form of a processor, and a memory, media or carrier with a computer program stored thereon, the computer program being adapted to cause a processor to control the steps according to the method described above.

According to one embodiment, the communication device in the refill vehicle contains control logics, e.g., in the form of a processor, and a memory, media or carrier with a computer program stored thereon, the computer program being adapted to cause a processor to control the steps according to the method described above.

According to one embodiment, the second communication device, the position sensor and the coordination device are integrated into one device.

According to one embodiment, the second communication device, the position sensor and the coordination device are separate devices.

According to one embodiment, the level sensor, the position sensor, the communication device and the coordination device are communicatively connected via an internal communication network configured to transfer data as signals between the devices. In one embodiment, the communication network is wired or wireless.

FIG. 11A shows an embodiment of a preplanned route comprising traverses 1111-1118 consisting of vectors associated with data representing a specific associated geographical distance $S_x$, a start coordinate $COORD_{start\_x}$, an end coordinate $COORD_{end\_x}$ and an associated average speed $V_x$. Every vector comprises a start coordinate, e.g., 1111_START, and an end coordinate, e.g., 1111_END.

FIG. 11B shows a further embodiment of a preplanned route comprising a traverse 1121 consisting of vectors associated with data representing a specific associated geographical distance, a start coordinate, an end coordinate and a common associated average speed.

Figure 12:
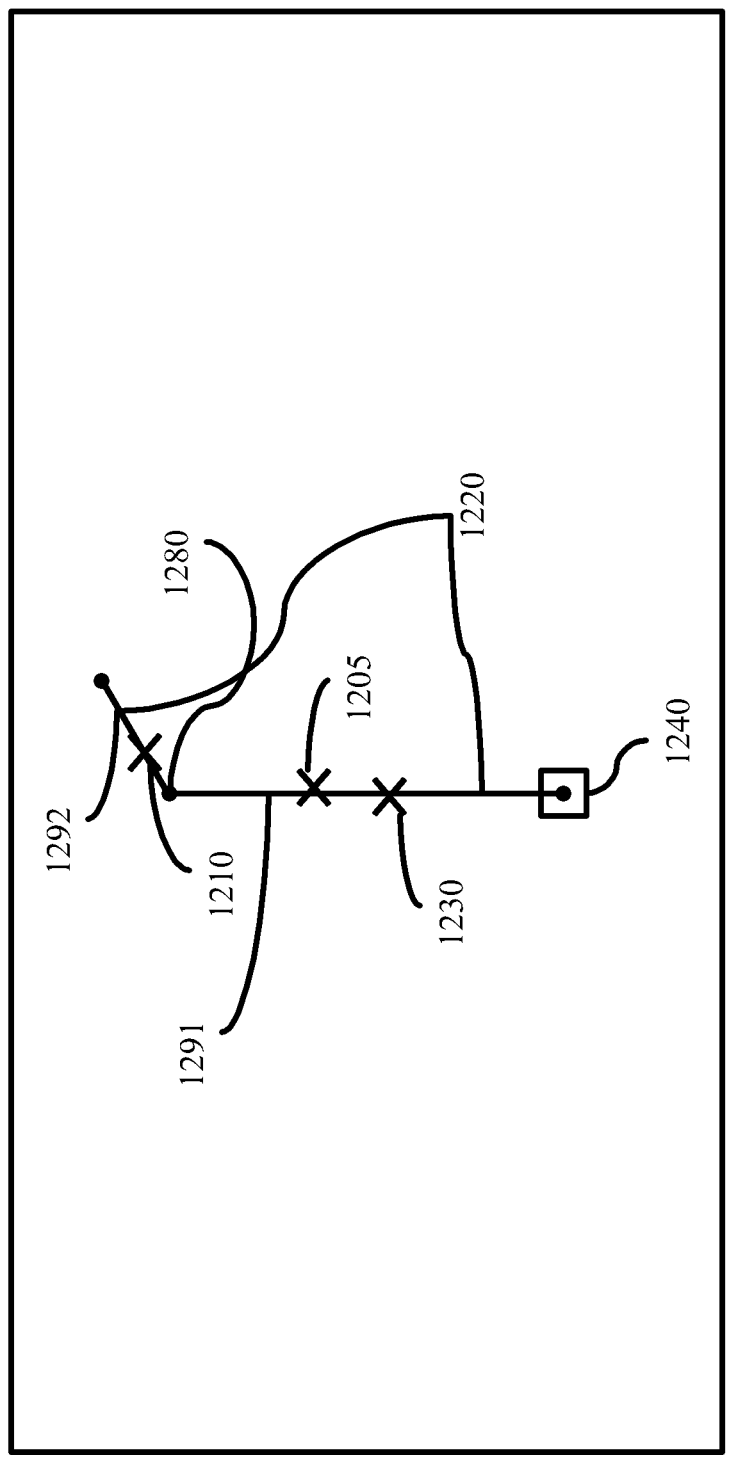
FIG. 12 shows an embodiment of the invention, where the coordination data can be generated based on a preplanned route comprising a traverse.

FIG. 12 shows an embodiment of how coordination data may be generated based on a preplanned route 1220 comprising a traverse, where the traverse comprises a first vector 1291 and a second vector 1292. In one example, the preplanned route 1220 comprises a start location 1240, the first vector 1291 has an associated geographical distance $S_{v1}$ of 100 m and an associated average speed of 10 m/s, and the second vector 1292 has an associated geographical distance $S_{v2}$ of 20 m and an associated average speed of 10 m/s. At a first coordinate 1230, level data are generated under a predefined threshold value indicating a low level, wherein said level data indicate a volume of a substance in a substance reservoir. At a second coordinate 1205, position data corresponding to the current position of the seed drill are generated and stored. Level data are converted from a volume measure to a time measure via a table $T_{table}$, as described in connection with FIG. 8.

The time for an agricultural machine to travel the distance associated with the first vector 1291 can be obtained as:

$$T = \frac{S}{V}$$

where T is the time, S is the distance, e.g., associated geographical distance, and v is the average speed, e.g., the associated average speed, as would be understood by a person skilled in the art. By also taking into account said second coordinate 1205 corresponding to the current position of the seed drill, a coordinate of an optimum refill location can be estimated. In a first step, the following is estimated:
Time to end coordinate for the first vector 1291

$T_{inter}$=distance(second coordinate 1205, end coordinate first vector)/10=>

$T_{inter}$=40/10=4 s

Remaining time to estimated refill location=$T_{table}$−$T_{inter}$=4.5−4=0.5 s

Distance along the second vector
$S_{delta}$=0.5*$V_{v2}$=0.5*10=5 m

A coordinate of an optimum refill location can then be estimated, e.g., by taking the end coordinate of the scaled vector:

$$\left\|\frac{S_{delta}}{S_{V2}}\right\| \cdot \text{second vector } 1292$$

where the scaled vector has the same start coordinate 1280 as the second vector 1292 and the end coordinate 1210 in the form of an estimated (optimum) refill location, which would be understood by a person skilled in the art. The calculation can also be performed for any number of vectors in a traverse.

In one embodiment, the internal communication network is one of Local Area Network (LAN), Metropolitan Area Network (MAN), Global System for Mobile Network (GSM), Enhanced Data GSM Environment (EDGE), High Speed Downlink Packet Access (HSDPA), Wideband Code Division Multiple Access (W-CDMA), Code Division Multiple Access (CDMA), Time Division Multiple Access (TDMA), Bluetooth®, Zigbee®, Wi-Fi, Voice over Internet Protocol (VoIP), LTE Advanced, IEEE802.16m, WirelessMAN-Advanced, Evolved High-Speed Packet Access (HSPA+), 3GPP Long Term Evolution (LTE), Mobile WiMAX (IEEE 802.16e), Ultra Mobile Broadband (UMB) (formerly Evolution-Data Optimized (EV-DO) Rev. C), Fast Low-latency Access with Seamless Handoff Orthogonal Frequency Division Multiplexing (Flash-OFDM), High Capacity Spatial Division Multiple Access (iBurst®) and Mobile Broadband Wireless Access (MBWA) (IEEE 802.20) systems, High Performance Radio Metropolitan Area Network (HIPERMAN), Beam-Division Multiple Access (BDMA), World Interoperability for Microwave Access (Wi-MAX) and ultrasonic communication, etc., but is not limited to these but can be any communication network known to a person skilled in the art.

According to one embodiment, the method steps described above can be controlled with the aid of a programmed computer apparatus containing a processor. Furthermore, although the embodiments of the invention described above with reference to the drawings comprise a computer and processes executed in a computer, the invention also covers computer programs, especially computer programs on or in a carrier adapted to implement the invention in practice. The computer program can be in the form of source code, object code, a code being a middle form between source and object code, such as in partially compiled form, or in any other form suitable for use when implementing the process according to the invention. The carrier can be any entity or device capable of carrying the program. For example, the carrier can comprise a storage medium such as a flash memory, a ROM (Read Only Memory), such as a CD (Compact Disc) or a semiconductor ROM, EPROM (Electrically Programmable ROM), EEPROM (Erasable EPROM), or a magnetic recording medium, such as a floppy disk or hard disk. Furthermore, the carrier can be a transferring carrier such as an electrical or optical signal, which may be conveyed through an electrical or optical cable or via radio or in other ways. When the program is embodied by a signal that can be conveyed directly by a cable or other device or means, the carrier may consist of such a cable, device or means. Alternatively, the carrier may be an integrated circuit in which the program is embedded, the integrated circuit being adapted to execute, or to be used when executing, the relevant processes.

According to one embodiment, wherein a computer program product for coordination of agricultural machines when refilling substance intended to be disseminated over an agricultural field comprises computer program parts configured to cause, when executed in a processor, the steps according to the method steps proposed above, to be performed.

According to one embodiment, wherein a computer readable medium or carrier with a computer program stored thereon for the coordination of agricultural machines when refilling substance intended to be disseminated over an agricultural field in order to estimate an optimum refill location, the computer program being adapted to cause a processor to control the steps according to the methods proposed above.

The invention claimed is:

1. A system for coordination of agricultural machines when refilling substance at a refill location, comprising:
　a level sensor that generates level data, wherein said level data indicate a volume of a substance in a substance reservoir;
　a position sensor that generates and stores position data, as well as stores or reads a preplanned route;
　a communication device that transmits and receives data; and
　a coordination device which:
　　generates coordination data, based on said level data, said preplanned route and said position data; and
　　transmits said generated coordination data via the communication device to a refill vehicle to coordinate meeting on the preplanned route.

2. The system according to claim 1, the coordination data comprising an estimated coordination time and an estimated coordination coordinate.

3. The system according to claim 1, the generated coordination data comprising multiple priority-sorted instances of at least estimated coordination time and estimated coordination coordinate.

4. The system according to claim 3, wherein the coordination data transmitted to the refill vehicle comprise a first set of multiple priority-sorted instances of coordination data, wherein the communication device also
　receives an instance of coordination data in order to confirm selection of the refill location.

5. The system according to claim 4, wherein coordination data are transmitted to the refill vehicle via a central unit.

6. The system according to claim 1, also comprising an interface device that presents data to a user to receive user data based on an indication from a user.

7. The system according to claim 6, wherein said interface device comprises a tablet computer.

8. The system according to claim 1, wherein the coordination data are generated based on an empirically planned route based on stored position data, based on a calculated preplanned route and on a dissemination area of the agricultural machine, or based on an indication from a user.

9. The system according to claim 2, the generated coordination data comprising a primary refill location, a secondary refill location and a tertiary refill location.

10. The system according to claim 9, wherein the coordination data transmitted to the refill vehicle comprise a first set of multiple priority-sorted instances of coordination data, describing the primary refill location, the secondary refill location and the tertiary refill location,
　wherein the communication device also receives an instance of coordination data in order to confirm selection of the refill location.

11. The system according to claim 10, wherein coordination data are transmitted to the refill vehicle via a central unit.

12. A method of a system for coordination of agricultural machines when refilling substance at a refill location, comprising:
　generating level data, said level data indicating a volume of a substance in a substance reservoir;
　generating and storing position data;
　storing or reading a preplanned route;
　generating, in a coordination device, coordination data, based on said level data, said preplanned route and said position data;
　transmitting said generated coordination data via a communication device to a refill vehicle to coordinate meeting on the preplanned route.

13. The method according to claim 12, wherein coordination data comprise an estimated coordination time and an estimated coordination coordinate.

14. The method according to claim 12 wherein generated coordination data comprise multiple priority-sorted instances of at least estimated coordination time and estimated coordination coordinate.

15. The method according to claim 14, wherein coordination data transmitted to the refill vehicle comprise a first set of multiple instances of coordination data, the method also comprising:
　receiving an instance of coordination data in order to confirm selection of the refill location.

16. The method according to claim 15, wherein coordination data are transmitted to the refill vehicle via a central unit.

17. The method according to claim 12, also comprising an interface device arranged to present data to a user and to receive user data based on an indication from a user.

18. The method according to claim 12, wherein coordination data are generated based on an empirically planned route based on stored position data, based on a calculated preplanned route and on a dissemination area of the agricultural machine, or based on an indication from a user.

19. The method according to claim 13, wherein generated coordination data comprise multiple priority-sorted instances of at least estimated coordination time and estimated coordination coordinate.

20. The method according to claim 19, wherein coordination data transmitted to the refill vehicle comprise a first set of multiple instances of coordination data, the method also comprising:
　receiving an instance of coordination data in order to confirm selection of the refill location.

21. The method according to claim 20, wherein coordination data are transmitted to the refill vehicle via a central unit.

* * * * *